United States Patent [19]

Kamata

[11] Patent Number: 5,757,628
[45] Date of Patent: May 26, 1998

[54] STABILIZED HIGH FREQUENCY SWITCHING POWER SUPPLY WITH SUPPRESSED EMI NOISE

[75] Inventor: Hisahiro Kamata, Iwanuma, Japan

[73] Assignee: Tohoku Ricoh Co., Ltd., Miyagi-ken, Japan

[21] Appl. No.: 790,968

[22] Filed: Jan. 29, 1997

[30] Foreign Application Priority Data

Jan. 31, 1996 [JP] Japan ................... 8-015162

[51] Int. Cl.⁶ .................................. H02M 3/335
[52] U.S. Cl. .................. 363/21; 363/40; 363/97
[58] Field of Search ................... 363/20, 21, 39, 363/40, 97, 131

[56] References Cited

U.S. PATENT DOCUMENTS

| | | | |
|---|---|---|---|
| 4,943,886 | 7/1990 | Quazi | 363/37 |
| 5,323,303 | 6/1994 | Dolland | 363/39 |
| 5,331,534 | 7/1994 | Suzuki et al. | 363/20 |
| 5,408,402 | 4/1995 | Nonnenmacher | 363/21 |
| 5,498,936 | 3/1996 | Smith | 315/247 |

FOREIGN PATENT DOCUMENTS

| | | |
|---|---|---|
| 5-161366 | 6/1993 | Japan . |
| 5-336751 | 12/1993 | Japan . |
| 6-98539 | 4/1994 | Japan . |
| 6-233521 | 8/1994 | Japan . |
| 6-236822 | 8/1994 | Japan . |

*Primary Examiner*—Jeffrey L. Sterrett
*Attorney, Agent, or Firm*—Armstrong, Westerman, Hattori, McLeland & Naughton

[57] ABSTRACT

An improved switching power unit is of the type which uses a capacitor C1 of large capacitance value as a primary DC power supply, inputs primary DC power from the capacitor C1 to a series circuit formed of the primary winding N1 of a high-frequency transformer 6 and a switching element Q, induces AC power in the secondary winding N2 of the transformer 6 by switching the switching element Q, and rectifies and smooths the AC power to produce and output DC power. In the improved switching power unit, an inductor L1 and/or inductor L2 of small inductance value are/is connected in series with the capacitor C1 of large capacitance value for smoothing the primary DC power, a bypass capacitor Cp is connected in parallel with a series circuit formed of the primary winding N1 of the high-frequency transformer 6 and the switching element Q, thereby bypassing high-frequency noise caused by switching and preventing it from passing through the capacitor C1, and a series circuit formed of a grounding resistor Rg and a grounding capacitor Cg is connected between frame ground G and a hot line 4p or a common line 4n. As a result, the operation of a switching circuit 11 of the switching power unit is stabilized, while electromagnetic interference noise is markedly suppressed since high-frequency noise leaking to frame ground G is converted to heat by the resistor Rg.

8 Claims, 6 Drawing Sheets

STABILIZED HIGH FREQUENCY SWITCHING POWER SUPPLY WITH SUPPRESSED EMI NOISE

BACKGROUND OF THE INVENTION

1. Field of the Invention

This invention relates to a switching power unit, more particularly to a switching power unit having means for stabilizing a switching circuit and suppressing EMI (electromagnetic interference) noise.

2. Description of the Related Art

Switching power units include the DC-to-DC converter and the DC-to-AC converter. Both use DC power obtained by rectifying and smoothing AC power from an AC power supply or DC power from a separate DC power source as primary DC power. The DC-to-DC converter converts the primary DC power to DC power of desired voltage and the DC-to-AC converts it to AC power of a desired frequency.

Since such switching power units provide highly efficient power conversion, have large power capacity for their size and weight and are low in cost, they are used as power units of capacities ranging widely from small to large. Recent efforts to further reduce the size and weight of switching power units have focused mainly on increasing switching frequency. This causes a problem, however, since the stability of switching circuit operation decreases with increasing switching frequency.

Japanese patent laid-open publication No. 6-98539, for example, teaches a switching power unit for coping with this problem.

Figure 10:
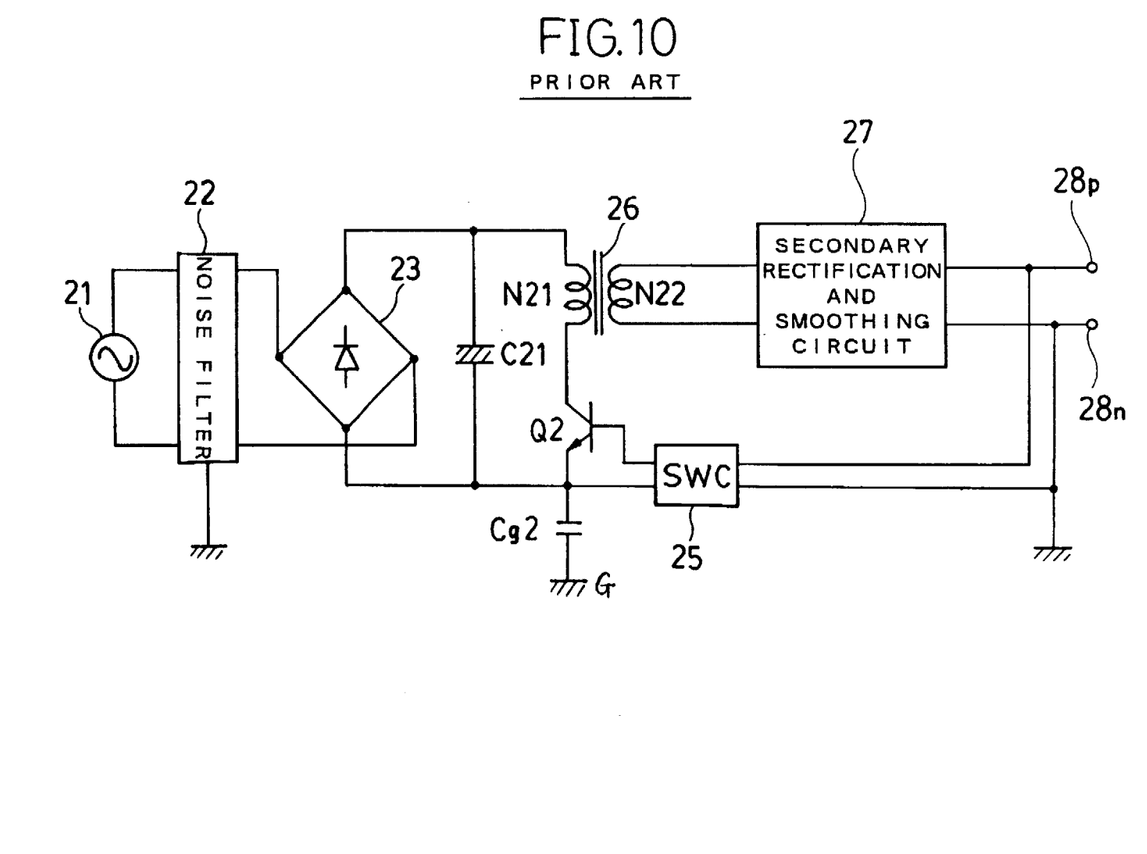
FIG. 10 is a circuit diagram showing an example of a prior-art switching power unit.

In the switching power unit taught by this publication, as shown in FIG. 10, AC power from an AC power supply 21 is passed through a noise filter 22 and supplied to a diode bridge 23 for full-wave rectification, the rectified power is smoothed by a capacitor C21 of large capacitance value, and the so-obtained primary DC power is applied to a series circuit consisting of the primary winding N21 of a transformer 26 and a transistor Q2. The transistor Q2 is switched by a switching control circuit (SWC) 25 to induce secondary AC power in the secondary winding N22 of the transformer 26.

The secondary AC power is rectified and smoothed by a secondary rectification and smoothing circuit 27 and the so-obtained DC power is output to a load from positive and negative output terminals 28p, 28n.

To stabilize the switching circuit of this switching power unit, a capacitor Cg2 is connected between the negative line of the primary DC power, specifically the negative terminal of the series circuit constituted by the primary winding N21 of the transformer 26 and the transistor Q2, and frame ground G so as to block the DC component and pass only the AC component to ground.

Although the provision of the capacitor Cg2 stabilizes the operation of the switching circuit, it leads to a new problem. Namely, switching noise consisting of noise at the switching frequency generated by the switching operation of the transistor Q2 and harmonics thereof leaks to frame ground G through the capacitor Cg2 and, further, to the load side through the negative side line of the secondary DC power, which is connected to frame ground G, and to the power line on the AC power supply 21 side through the noise filter 22, which is also connected to frame ground G, even though the original function of the noise filter 22 is to block the input/output of noise.

Another problem that arises is that, owing to the use of higher switching frequencies, harmonics of the switching frequency, particularly those constituting noise in the 30 MHz–300 MHz range, are radiated as strong EMI noise through frame ground, the power line on the AC power supply 21 side and the load-side connecting lines connected to the output terminals 28p, 28n, all of which act as antennas.

Nowadays, various types of electronic devices are often used in the limited space of a home or office, increasing the likelihood of line noise, EMI noise and the like from one piece of equipment adversely affecting, as through interference, other equipment connected to the same power line or other equipment located nearby even if not connected to the same power line. Because of this, severe restrictions are being imposed on the permissible level of such noise. This is particularly true in Europe, where the marketing of equipment whose EMI noise exceeds the prescribed level is prohibited.

SUMMARY OF THE INVENTION

This invention is directed to overcoming the aforesaid problems by providing a switching power unit wherein the operation of the switching circuit is stabilized and generation of EMI noise is suppressed even under operation at a high switching frequency.

This invention is applicable to a switching power unit which uses a capacitor of large capacitance value as the primary DC power supply, inputs primary DC power from the capacitor to a series circuit formed of the primary winding of a high-frequency transformer and a switching element, induces AC power in the secondary winding of the transformer by switching the switching element, and rectifies and smooths the AC power to produce and output DC power.

This invention also applicable to a switching power unit of the following power feedback type.

Specifically, it is applicable to a switching power unit wherein a series circuit formed of a capacitor of large capacitance value and a discharge diode connected in the direction for discharging the capacitor and a series circuit formed of the primary winding of a high-frequency transformer and a switching element are connected in parallel between the output terminals of a full-wave rectification circuit for converting AC power input from an AC power supply into primary DC power. The primary DC power is switched by the switching element to induce AC power in the secondary winding of the transformer and the induced AC power is rectified and smoothed to output DC power. A part of the power induced in the primary winding of the transformer or in a third winding separately provided in the transformer is fed back to the capacitor.

Figure 1:
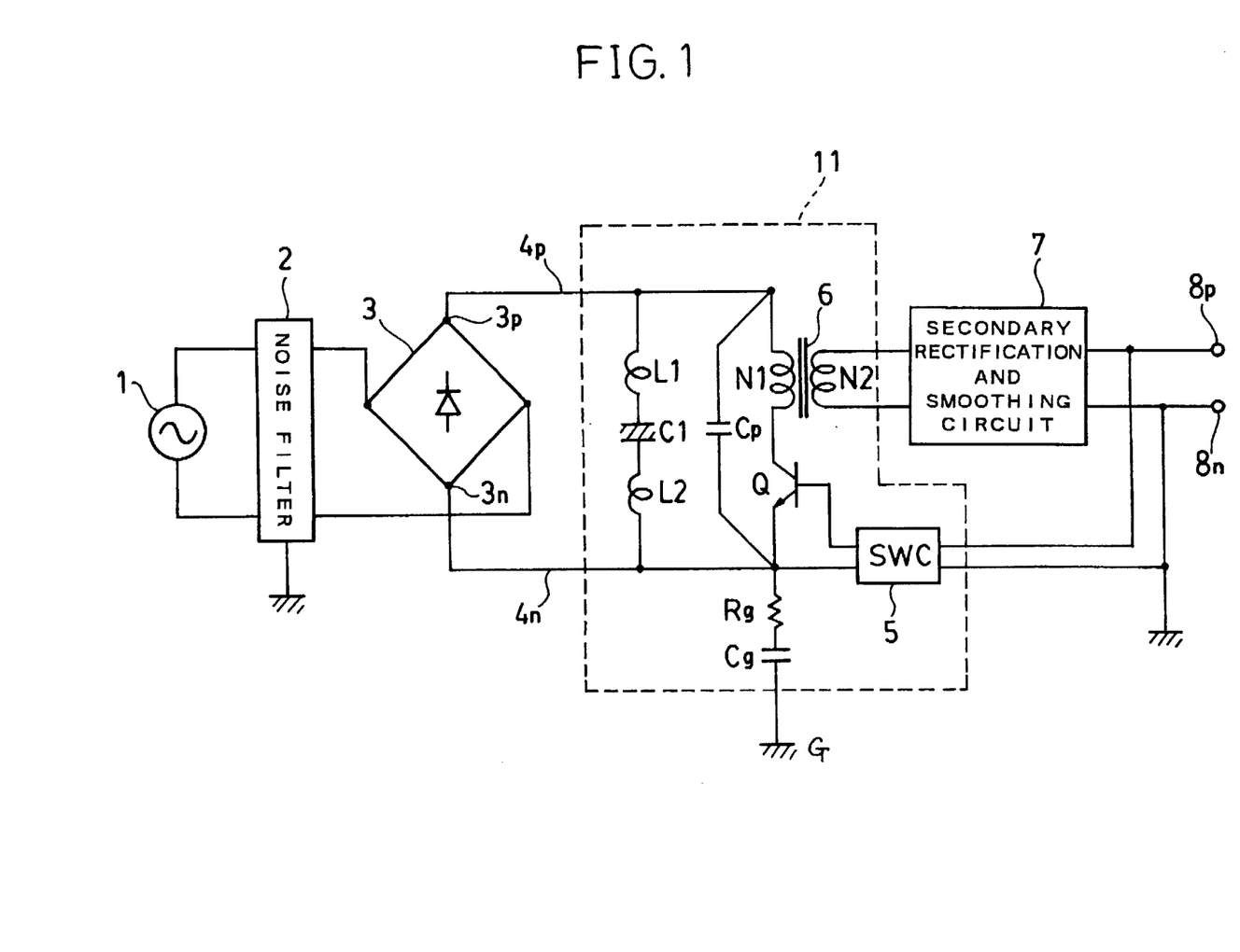
FIG. 1 is a circuit diagram showing a switching power unit that is a first embodiment of the invention.

The invention achieves the aforesaid object by providing a switching power unit of one of the aforesaid types to which it is applicable, wherein, as shown in FIG. 1, an inductor L1 and/or inductor L2 of small inductance value are/is connected in series with a capacitor C1 of large capacitance value, and a bypass capacitor Cp of small capacitance value is connected in parallel with a series circuit formed of the primary winding Ni of a high-frequency transformer 6 and a switching element Q. As a result, high-frequency noise caused by switching is bypassed and prevented from passing through the capacitor C1.

A series circuit formed of a grounding resistor Rg and a grounding capacitor Cg is connected between frame ground G and at least one point among the opposite ends of the series circuit formed of the capacitor C1 of large capacitance value and the inductor L1 and/or inductor L2 and the opposite ends of the series circuit formed of the primary winding N1 of the transformer 6 and the switching element Q.

3

As a result, the operation of the switching circuit, designated by reference numeral 11 in the figure, is stabilized, high-frequency noise leaking to frame ground G is converted to heat by the resistor Rg, the Q (quality factor) of the circuit is lowered, and EMI noise is markedly suppressed.

The above and other objects, features and advantages of the invention will be apparent from the following detailed description which is to be read in conjunction with the accompanying drawings.

DETAILED DESCRIPTION OF THE PREFERRED EMBODIMENTS

Embodiments of the invention will now be explained with reference to the drawings.

Figure 2:
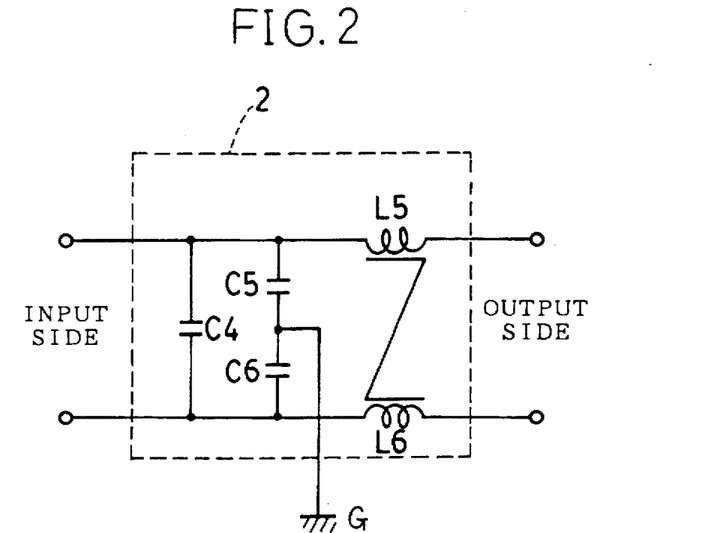
FIG. 2 is a circuit diagram showing an example of the noise filter of FIG. 1.
Figure 3:
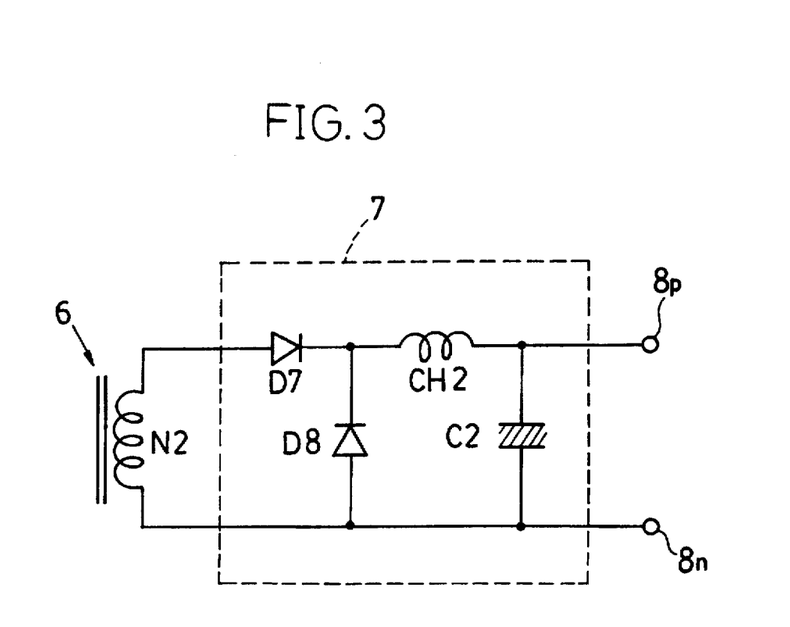
FIG. 3 is a circuit diagram showing an example of the secondary rectification and smoothing circuit of FIG. 1.

First Embodiment: FIGS. 1 to 3

A first embodiment of the switching power unit according to the invention will be explained with reference to FIGS. 1 to 3.

The switching power unit shown in FIG. 1 comprises a noise filter 2 supplied with AC power from an AC power supply 1, a diode bridge 3 which full-wave rectifies the AC power passed through the noise filter 2 to convert it into primary DC power, a switching circuit 11 which switches the converted primary DC power and outputs secondary AC power, a secondary rectification and smoothing circuit 7 which rectifies and smooths the secondary AC power output by the switching circuit 11 to convert it into secondary DC power, and terminals 8p, 8n for outputting the secondary DC power.

The switching circuit 11 comprises a high-frequency transformer 6, a series circuit formed of a capacitor C1 of large capacitance value for smoothing the primary DC power and inductors L1, L2 of small inductance value connected to opposite sides of the capacitor C1, a series circuit formed of the primary winding N1 of the transformer 6 and a transistor (which can be a field-effect transistor) Q serving as a switching element, a bypass capacitor Cp connected in parallel with this series circuit, and a switching control circuit 5 for switching the transistor Q by outputting drive pulses to the base thereof. The secondary winding N2 of the transformer 6 is connected to the secondary rectification and smoothing circuit 7.

In this embodiment, the series circuit formed of the capacitor C1 and the inductors L1, L2, the series circuit formed of the primary winding N1 of the transformer 6 and the transistor Q, and the bypass capacitor Cp are connected in parallel between a positive hot line 4p and a negative common line 4n connected to the positive and negative output terminals 3p, 3n of the diode bridge 3.

The point where the series circuit formed of the primary winding N1 of the transformer 6 and the transistor Q connects with the common line 4n is connected to frame ground G through a grounding series circuit which is formed of a resistor Rg and a capacitor Cg and serves to stabilize the operation of the switching circuit 11.

FIGS. 2 and 3 are circuit diagrams respectively showing an example of the noise filter 2 of FIG. 1 and an example of the secondary rectification and smoothing circuit 7 of the same figure.

The noise filter 2 shown in FIG. 2 is constituted of high-frequency capacitors C4, C5, C6 and magnetically coupled high frequency inductors L5 and L6, with the capacitor C4 and a series circuit formed of the capacitors C5 and C6 connected in parallel between a pair of AC lines a, b. The connection point between the capacitors C5, C6 is connected to frame ground G. The AC lines a, b are connected in series with the inductors L5, L6, respectively.

In this configuration, opposite phase components of the high-frequency noise present on the AC lines a, b are eliminated by passage through the capacitor C4, while same phase and asymmetrical components thereof are dropped to frame ground G through the capacitors C5, C6. In addition, the input side and output side are cut off from each other by the inductors L5, L6. As a result, neither noise present on the AC lines a, b nor noise produced inside the switching power unit can leak to the other side.

The secondary rectification and smoothing circuit 7 is shown in FIG. 3. When the side of the secondary winding N2 of the transformer 6 designated as c in this figure is at positive potential owing to the secondary AC power induced in the secondary winding N2 by ON/OFF switching of the transistor Q, current passes through a rectifier diode D7 into a choke coil CH2 and charges a smoothing capacitor C2, while also exciting the choke coil CH2.

When the potential on the side c of the secondary winding N2 becomes zero or negative so that the rectifier diode D7 no longer conducts, the excitation energy stored in the choke coil CH2 is converted back to current which flows into the capacitor C2 and a commutation diode D8 thus charging the capacitor C2. Owing to the charging of the capacitor C2 in this manner, smoothed secondary DC power is output to the load through the output terminals 8p, 8n.

The AC power input from the AC power supply 1 shown in FIG. 1 is filtered of high-frequency noise by the noise filter 2 and full-wave rectified by the diode bridge 3, thereby converting it to primary DC power which is smoothed by the capacitor C1 of large capacitance value. Although the primary DC power that charges the capacitor C1 includes a ripple component consisting of the fundamental frequency component having double the frequency of the power supply and harmonics of the fundamental frequency component, the inductors L1, L2 connected in series with the capacitor C1 do not act as inductors with respect to this ripple component because they are of small inductance value.

The capacitor C1 charged in this manner operates as the primary DC power supply of the switching circuit 11 and the transistor Q ON/OFF controls the current flowing through the primary winding N1 of the transformer 6 based on the drive pulses output by the switching control circuit 5.

As a result, the secondary AC power induced in the secondary winding N2 of the transformer 6 is rectified and smoothed by the secondary rectification and smoothing circuit 7 to convert it to secondary DC power that is output to the load through the output terminals 8p, 8n.

The switching control circuit 5 detects the voltage between the output terminals 8p, 8n, i.e., the output voltage of the switching power unit. When the output voltage is higher than a value set in advance, the switching control circuit 5 reduces the ON duty value of the drive pulses output to the transistor Q, and when it is lower, the switching control circuit 5 increases the ON duty value. This pulse width modulation (PWM) control constitutes constant voltage control for maintaining the output voltage at the set value.

At the instant the transistor Q changes from ON to OFF during operation of the switching circuit 11, a counter-electromotive force is produced across the primary winding N1 of the transformer 6 and the resulting shock is transmitted through the hot line 4p and the capacitor C1 to the common line 4n. Ordinarily, however, the capacitor C1 is large in size owing to its high breakdown voltage (1.5 to 2 times the AC voltage of the AC power supply 1) and large capacitance value and is therefore located some distance from the series circuit formed of the primary winding N1 and the transistor Q. Because of this, the arrival at the switching control circuit 5 of the shock transmitted through the common line 4n is delayed.

Although the delay is very short, it is not negligible relative to the periods of the switching frequency and harmonics thereof, especially in light of the higher switching frequencies being used. Destabilization of the switching control circuit 5 and of the operation of the switching circuit 11 is therefore likely. Prevention of this operational destabilization by the conventional method shown in FIG. 10, i.e., by connection of the capacitor Cg2 between the common line and frame ground G, leads to increased EMI noise owing to the passage of switching noise to frame ground.

In the switching circuit 11 shown in FIG. 1, therefore, the inductors L1, L2 of small inductance value are connected to opposite sides of the capacitor C1 so as to prevent the high-frequency noise including the shock from passing through the capacitor C1 and the bypass capacitor Cp is connected between the opposite ends of the series circuit formed of the primary winding N1 and the transistor Q. As a result, the high-frequency noise including the shock passes through the bypass capacitor Cp without delay, thereby markedly reducing noise.

More specifically, the circuit of FIG. 1 is configured so that the frequency component f desired to be reduced is removed by the bypass capacitor Cp. Defining the length of the closed loop constituted by the primary winding N1 of the transformer 6, the transistor Q and the bypass capacitor Cp (i.e., the length of the winding wire of the primary winding N1 plus the lengths of the connection wires of the transistor Q, the bypass capacitor Cp and the like) as A and the wavelength at frequency f as $\lambda$, then, since it holds that $f=\lambda/2\Pi$, it is preferable to mount the bypass capacitor Cp so that its wiring length accounts for $\lambda/8$ to $\lambda/16$ or less of the loop length A.

Moreover, since the grounding series circuit formed of the resistor Rg and the capacitor Cg is connected between the common line 4n and frame ground G, the operation of the switching circuit 11 is stabilized and most of the power of the noise passing through the capacitor Cg to frame ground G is converted to heat, the Q (quality factor) of the circuit is lowered, by the resistor Rg.

A large reduction can therefore be achieved in the passage of noise from frame ground G through the capacitors C5, C6 of the noise filter 2 (FIG. 2) to the AC line b of the AC power supply 1 and through the negative secondary DC power line to the line connected to the load, while EMI radiated from frame ground G and the different lines acting as antennas can also be greatly reduced.

Figure 4:
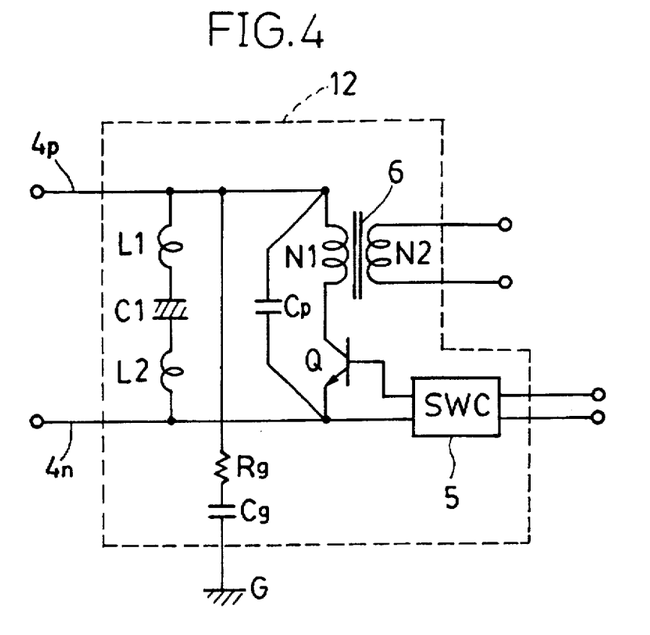
FIG. 4 is a circuit diagram showing the switching circuit of a switching power unit that is a second embodiment of the invention.

Second Embodiment: FIG. 4

A second embodiment of the invention will now be explained with reference to FIG. 4.

FIG. 4 is a circuit diagram showing only the switching circuit 12 of the second embodiment of the invention switching power unit.

The switching circuit 12 differs from the switching circuit 11 of FIG. 1 only in the point that the grounding series circuit formed of the resistor Rg and the capacitor Cg is connected between the hot line 4p and frame ground G instead of between the common line 4n and frame ground G.

Since the configuration of the switching power unit is identical with that of FIG. 1 in all other respects, components the same as those in FIG. 1 are assigned the same reference symbols as those in FIG. 1 and portions other than the switching circuit are omitted from the drawing.

When the grounding series circuit formed of the resistor Rg and the capacitor Cg is connected between the hot line 4p and frame ground G in this manner, exactly the same effects as obtained with the embodiment of FIG. 1 are achieved since the connection of the bypass capacitor Cp between the hot line 4p and the common line 4n makes the impedance to noise extremely small.

Figure 5:
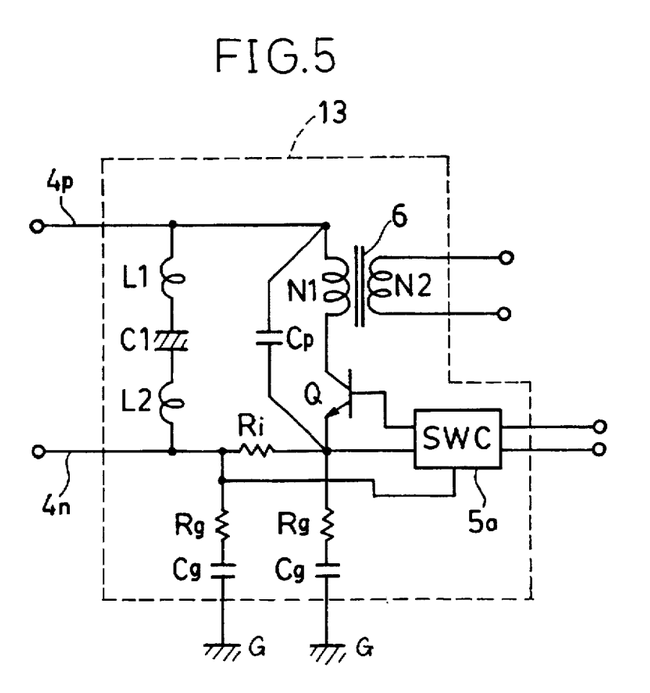
FIG. 5 is a circuit diagram showing the switching circuit of a switching power unit that is a third embodiment of the invention.

Third Embodiment: FIG. 5

A third embodiment of the invention will now be explained with reference to FIG. 5.

FIG. 5 is a circuit diagram showing only the switching circuit 13 of the third embodiment of the invention switching power unit.

The switching circuit 13 differs from the switching circuit 11 of FIG. 1 in the point that an overcurrent detection resistor Ri is connected between the common line 4n and the parallel connection of the bypass capacitor Cp and the series circuit formed of the primary winding N1 and the transistor Q, and that the switching control circuit 5 is replaced with a switching control circuit 5a which discontinues output of drive pulses when input with an overcurrent detection signal from the overcurrent detection resistor Ri.

In addition, two grounding series circuits each formed of a resistor Rg and a capacitor Cg are connected one between either end of the overcurrent detection resistor Ri and frame ground G.

Since the configuration of the switching power unit is identical with that of FIG. 1 in all other respects, components the same as those in FIG. 1 are assigned the same reference symbols as those in FIG. 1 and portions other than the switching circuit are omitted from the drawing.

Like the switching control circuit 5 of FIG. 1, the switching control circuit 5a of the switching circuit 13 conducts PWM control based on the detected output voltage. In addition, however, it is constantly input from the overcurrent detection resistor Ri with the value of the current flowing through the series circuit formed of the primary winding N1 and the transistor Q and immediately discontinues the output of drive pulses when this current value exceeds a prescribed threshold value (indicative of overcurrent).

Since the discontinuance of drive pulse output stops the switching of the transistor Q, risk of damage by burning of the switching power unit components and the load can be eliminated.

Figure 6:
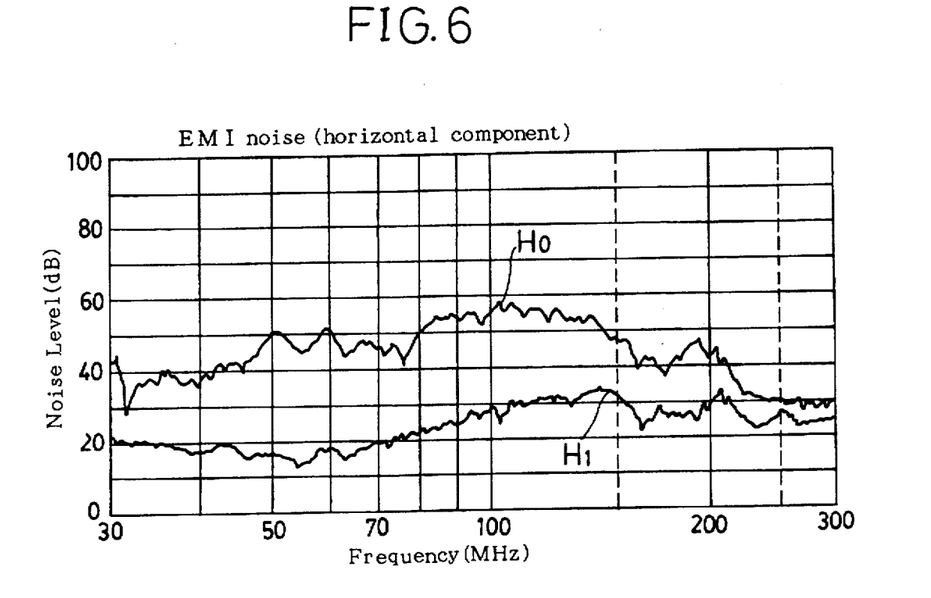
FIG. 6 is a graph showing the power spectrum of the horizontal component of EMI noise produced by a switching power unit equipped with the switching circuit shown in FIG. 5 in comparison with that of a prior-art switching power unit.
Figure 7:
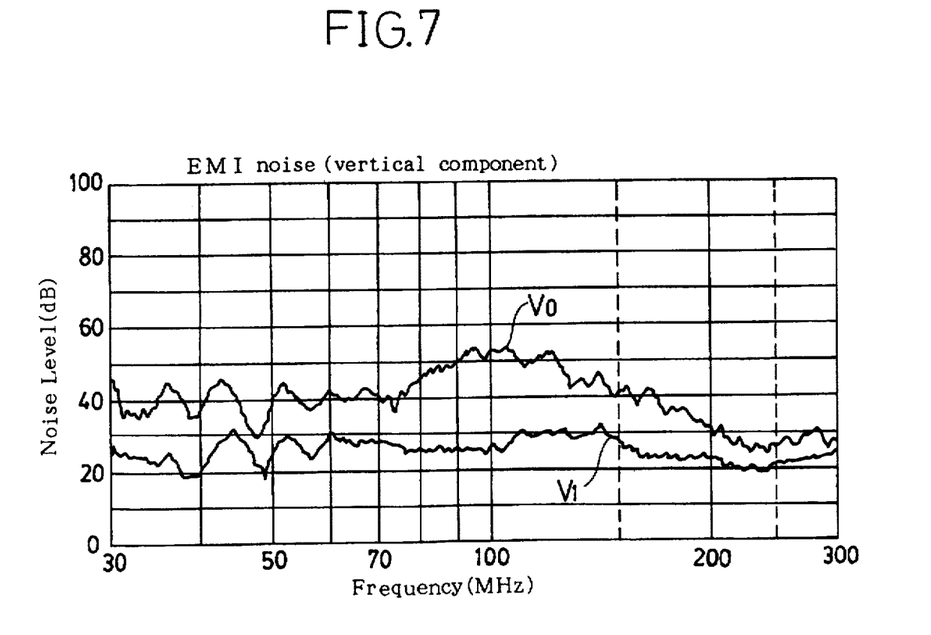
FIG. 7 is a graph showing the power spectrum of the vertical component of the same EMI noise in comparison with that of the prior-art switching power unit.

FIGS. 6 and 7 are graphs showing power spectra of the EMI noise produced by a switching power unit equipped with the switching circuit 13 shown in FIG. 5 (invention switching power unit) in comparison with corresponding power spectra of the prior-art switching power unit shown in FIG. 10. FIG. 6 shows the power spectra of the EMI horizontal components (readings obtained with the antenna of the measuring instrument oriented horizontally) and FIG. 7 shows the EMI vertical components (readings obtained with the antenna of the measuring instrument oriented vertically).

In both figures, the horizontal axis is logarithmically scaled for frequency in the range of 30 MHz–300 MHz and the vertical axis is scaled in decibels based on 1 μV of electromotive force generated per meter of antenna length defined as 0 dB.

In FIG. 6, the curve $H_0$ represents noise in the horizontal direction from the prior-art unit and the curve $H_1$ represents noise in the horizontal direction from the invention unit. In FIG. 7, the curve $V_0$ represents noise in the vertical direction from the prior-art unit and the curve $V_1$ represents noise in the vertical direction from the invention unit.

The invention switching power unit and the prior-art switching power unit subjected to measurement had the following constants in common: switching frequency, 500 KHz; capacitance of large capacitors C1 and C21, 820 μF; and capacitance of grounding capacitors Cg and Cg2, 1500 pF. Though not shown, each switching power unit had a snubber circuit consisting of a resistor and a capacitor connected across its primary winding N1 or primary winding N21.

The other constants of the switching circuit 13 shown in FIG. 5 were: inductance of inductors L1 and L2, 1 μH; capacitance of bypass capacitor Cp, 10 μF; resistance of grounding resistor Rg, 470 Ω; and resistance of overcurrent detection resistor Ri, 10–20 mΩ.

As can be seen from FIGS. 6 and 7, both the horizontal and vertical components of the EMI noise of the invention switching power unit are held to within about 30 dB (32 μV/m) over the full range, which amounts to a noise reduction of 10–20 dB relative to the prior art. The effect of the invention is particularly great in the vicinity of 100 MHz, where it achieves a marked noise reduction of 20–30 dB notwithstanding that it has been considered difficult to reduce EMI noise in this frequency region.

Moreover, no unstable operation was observed in the switching circuit 13 of this invention.

Figure 8:
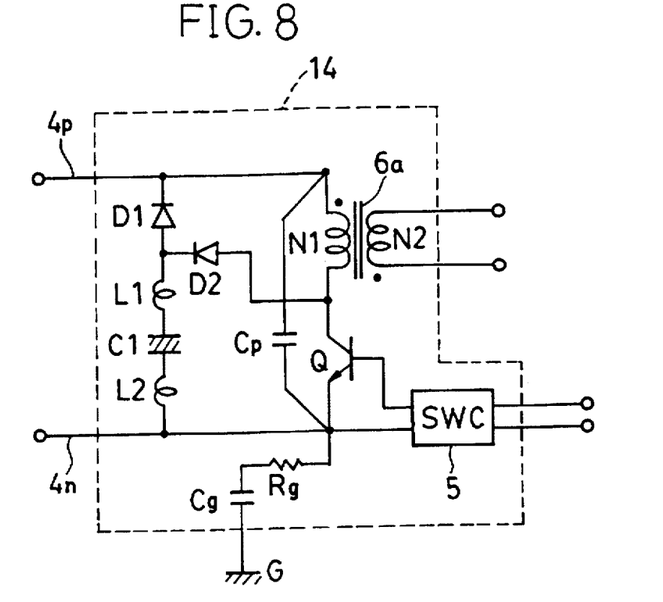
FIG. 8 is a circuit diagram showing the power feedback type switching circuit of a switching power unit that is a fourth embodiment of the invention.

Fourth Embodiment: FIGS. 8 and 1

A fourth embodiment of the invention will now be explained mainly with reference to FIG. 8.

FIG. 8 is a circuit diagram showing only the switching circuit 14 of the fourth embodiment of the invention switching power unit.

Although this fourth embodiment is a power feedback type switching power unit, portions other than the switching circuit thereof are identical with those of the switching power unit shown FIG. 1 and are therefore omitted from the figure.

The switching circuit 14 shown in FIG. 8 has a transformer 6a of flyback type in which the phase is reversed between the primary winding N1 and the secondary winding N2. This is different from the forward transformer 6 (FIG. 1) in which the phase is the same between the primary winding N1 and the secondary winding N2.

Moreover, the negative terminal of the series circuit formed of the capacitor C1 of large capacitance value and the inductors L1, L2 is connected to the common line 4n and the positive terminal thereof is connected to the hot line 4p through a diode D1 for discharging the capacitor C1 and to the connection point between the primary winding N1 and the transistor Q through a diode D2 for charging the capacitor C1, whereby the switching circuit is constituted to be of the power feedback type.

In the switching circuit 14, the grounding series circuit formed of the resistor Rg and the capacitor Cg is connected between frame ground G and the common line 4n side of the series circuit formed of the primary winding N1 of the transformer 6a and the transistor Q. Alternatively, however, this grounding series circuit can, as in the switching circuit 12 of FIG. 4, be connected between frame ground G and the hot line 4p side of the series circuit formed of the primary winding N1 and the transistor Q.

The switching power unit of this fourth embodiment is constituted by replacing the switching circuit 11 of the switching power unit shown in FIG. 1 with the switching circuit 14 shown in FIG. 8. Its operation will now be explained with reference to FIGS. 1 and 8.

Since the transformer 6a of the switching circuit 14 of FIG. 8 is of flyback type, the DC-to-DC converter constituted by the switching circuit 14 and the secondary rectification and smoothing circuit 7 of FIG. 1 is of the ON-OFF type. When the transistor Q is ON, therefore, primary DC power flows through the primary winding N1 but the rectifier diode D7 of the secondary rectification and smoothing circuit 7 prevents current from flowing through the secondary winding N2. The current flowing through the primary winding N1 therefore excites the transformer 6a (stores it as magnetic energy).

When the transistor Q turns OFF, the polarity of the primary winding N1 and the secondary winding N2 both reverse, so that the magnetic energy stored by the transformer 6a is converted back to current. A part of this current passes through the rectifier diode D7 to be converted into smoothed secondary DC power by the secondary rectification and smoothing circuit 7. This secondary DC power is output to the load (not shown) connected to the positive and negative output terminals 8p, 8n of FIG. 1.

The AC power input through the noise filter 2 from the AC power supply I of FIG. 1 is output from the diode bridge 3 as full-wave rectified primary DC power of pulsating waveform. Immediately after the AC power supply is turned ON, the transistor Q remains OFF owing to the inoperative state of the switching control circuit 5 of FIG. 8 and, as a result, the primary DC power charges the capacitor C1 through the primary winding N1 of the transformer 6a and the diode D2. Switching begins after the voltage across the capacitor C1 has reached a certain level.

If the common line 4n is defined to be at the reference value of 0 V, the instantaneous value of the output voltage of the diode bridge 3 is defined as Vi and the voltage across the capacitor C1 is defined as Vc, then, after the start of switching, the current flowing through the primary winding N1 of the transformer 6a when the transistor Q is ON is input from the AC power supply 1 through the diode bridge 3 when the Vi is higher than Vc and is supplied from the capacitor C1 through the diode D1 when Vi is lower than Vc, thereby exciting the transformer 6a in either case. (The inductors L1, L2 can be ignored.)

The diode Di operates to prevent direct charging of the smoothing capacitor C1 by the diode bridge 3 when the instantaneous value Vi of the output voltage of the diode bridge 3 is higher than the voltage Vc across the capacitor C1 and to prevent current discharged from the capacitor C1 from flowing back to the diode bridge 3 when Vi is lower than Vc.

In addition, the diode D2 operates to prevent shorting across the capacitor C1 when the transistor Q turns ON and its collector voltage becomes 0 V.

When the transistor Q turns OFF, counter-electromotive forces are produced in the primary winding N1 and the secondary winding N2, the magnetic energy stored in the transformer 6a is converted back to current, a part of this current passes from the secondary winding N2 through the secondary rectification and smoothing circuit 7, and, insofar as the sum of the instantaneous value Vi of the output voltage of the diode bridge 3 and the counter-electromotive force of the primary winding N1 exceeds the voltage Vc across the capacitor C1, the remainder thereof charges the capacitor C1 through the diode D2 even if Vi is lower than Vc.

Since a current of the same value as the current charging the capacitor C1 is supplied from the AC power supply 1 through the diode bridge 3, the ON angle is enlarged, thereby suppressing the peak current and greatly improving the power factor.

Figure 9:
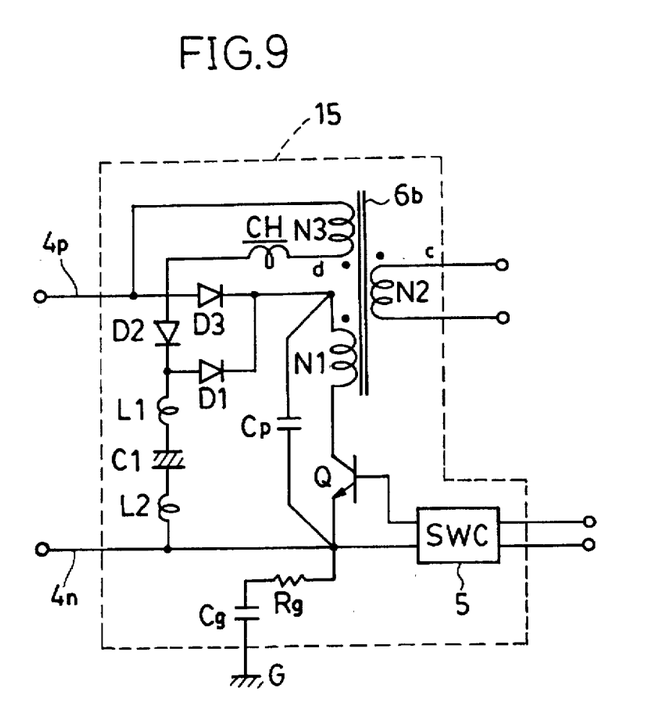
FIG. 9 is a circuit diagram showing the power feedback type switching circuit of a switching power unit that is a fifth embodiment of the invention.

Fifth Embodiment: FIGS. 9 and 1

A fifth embodiment of the invention will now be explained mainly with reference to FIG. 9.

FIG. 9 is a circuit diagram showing only the switching circuit 15 of the fifth embodiment of the invention switching power unit.

Although this fifth embodiment is a power feedback type switching power unit, portions other than the switching circuit thereof are identical with those of the switching power unit shown FIG. 1 and are therefore omitted from the figure.

Unlike the switching circuit 14 of FIG. 8, which uses the flyback transformer 6a and feeds back power induced in the primary winding N1, the switching circuit 15 of FIG. 9 uses a forward transformer 6b equipped with a third winding N3 and feeds back power induced in the third winding N3.

The switching circuit 15 also differs from the switching circuit 14 of FIG. 8 in the point that a diode D2 exclusively for charging the capacitor C1 of large capacitance value is incorporated with its anode connected to the positive terminal of the series circuit formed of the capacitor C1 and the inductors L1, L2 and its cathode connected to one end of the third winding N3 of the transformer 6b through a choke coil CH of small inductance, the other end of the third winding N3 being connected to the hot line 4p.

A diode D3 is inserted in the hot line 4p to prevent current discharged from the capacitor C1 from flowing back to the diode bridge 3.

The switching power unit of this fifth embodiment is constituted by replacing the switching circuit 11 of the switching power unit shown in FIG. 1 with the switching circuit 15 shown in FIG. 9. Its operation will now be explained with reference to FIGS. 1 and 9.

Since the transformer 6b of the switching circuit 15 of FIG. 9 is of forward type, when the transistor Q is ON and current flows through the primary winding N1, the side c of the secondary winding N2 connected to the rectifier diode D7 of the secondary rectification and smoothing circuit 7 shown in FIG. 3 and the side d of the third winding N3 connected to the choke coil CH are both positive.

It is obvious that when the transistor Q is ON, the current flowing through the primary winding N1 of the transformer 6b is supplied from the diode bridge 3 while the instantaneous value Vi of the output voltage of the diode bridge 3 is higher than the voltage Vc across the capacitor C1 and is supplied from the capacitor C1 through the inductors L1, L2 and the diode D1 while Vi is lower than Vc. The current flowing through the primary winding N1 produces an electromotive force in the third winding N3 that causes the end d thereof to become positive.

Therefore, irrespective of whether the source of the current supplied to the primary winding N1 of the transformer 6b is the diode bridge 3 or the capacitor C1, a part thereof passes through the third winding N3, the choke coil CH, and the series circuit formed of the capacitor C1 and the inductors L1, L2, thereby charging the capacitor C1 and exciting the choke coil CH.

When the transistor Q turns OFF, the electromotive force in the third winding N3 falls to zero, while a counter-electromotive force is produced in the choke coil CH, whereby the excitation energy stored in the choke coil CH is converted back to current which flows into and charges the capacitor C1.

In other words, a part of the current discharged by the capacitor C1 is fed back in this way during the period that the voltage Vc across the capacitor C1 is higher than the instantaneous value Vi of the output voltage of the diode bridge 3.

On the other hand, during the period that the instantaneous value Vi of the output voltage of the diode bridge 3 is higher than the voltage Vc across the capacitor C1, a part of the current output from the diode bridge 3 passes through the third winding N3 and the choke coil CH and charges the capacitor C1. This current from the diode bridge 3 is, however, superimposed on current that switching of the transistor Q produces in the charging circuit constituted by the third winding N3 and the choke coil CH, so that the capacitor C1 is charged by the sum of these currents.

As a result, the peak value of the AC power input from the AC power supply 1 is suppressed, the power factor improved and generation of noise prevented.

Moreover, since like the inductors L1, L2 the choke coil CH used in the switching circuit 15 is also a high-frequency choke coil matched to the switching frequency of the transistor Q, it is much smaller, lighter and lower in cost than the low-frequency choke coil used in the conventional choked input smoothing circuit.

The power feedback type switching circuits 14 and 15 shown in FIGS. 8 and 9 also have the inductors L1, L2 connected on opposite sides of the capacitor C1, the bypass capacitor Cp connected in parallel with the series circuit formed of the primary winding N1 of the transformer 6a or 6b and the transistor Q, and the series circuit formed of the resistor Rg and the capacitor Cg connected between the common line 4n and frame ground G.

Owing to this configuration, generation of noise by the transistor Q at its switching frequency and harmonics thereof is reduced, leakage of noise to frame ground G is markedly suppressed, and EMI noise is greatly reduced.

It is a common feature of the first to fifth embodiments explained in the foregoing that the grounding series circuit formed of the resistor Rg and the capacitor Cg can produce substantially the same effect when connected between frame ground G and any of four points: the opposite ends of the series circuit formed of the capacitor C1 and the inductors L1, L2 and the opposite ends of the series circuit formed by the primary winding N1 and the transistor Q. The most effective connection point should be determined by tests conducted with the actual switching circuit.

While it is also possible to connect grounding circuits at multiple points, it is generally preferable to follow the "one-point earth" principle and provide only one grounding circuit at the most effective point, since this best ensures avoidance of unexpected trouble. From this viewpoint, the configuration of the switching circuit 13 of FIG. 5 is an exception and is adopted because, even though the value of the resistor Ri is small (10–20 mΩ) its impedance to high-frequency noise is large in comparison with the capacitors. Based on test results, therefore, grounding series circuits each formed of a resistor Rg and a capacitor Cg were provided at two points on opposite sides of the overcurrent detection resistor Ri.

Circuit diagram analysis would lead one to conclude that the effect obtained by connecting the inductors L1, L2 (1 μH each) on opposite sides of the capacitor C1 (820 μF) could also be obtained by connecting a single inductor (of 2 μH) on one side. In fact, however, tests show that the noise suppressing effect is somewhat better when a 1 μH inductor is connected on either side of the capacitor C1.

As can be understood from the foregoing explanation, the invention provides a switching power unit wherein the operation of the switching circuit is stabilized and generation of EMI noise is suppressed even under operation at a high switching frequency.

What is claimed is:

1. A switching power unit which uses a capacitor of large capacitance value as a primary DC power supply, inputs primary DC power from the capacitor to a first series circuit formed of a primary winding of a high-frequency transformer and a switching element, induces AC power in a secondary winding of the transformer by switching the switching element by use of a switching control circuit, and rectifies and smooths the AC power to produce and output DC power, the switching power unit comprising:

a second series circuit including at least one inductor of small inductance value connected in series with the capacitor of large capacitance value, a bypass capacitor of small capacitance value connected in parallel with said first series circuit, and a third series circuit formed of a grounding resistor and a grounding capacitor connected between frame ground and at least one end of each of said first and second series circuits.

2. A switching power unit according to claim 1, further comprising:

an overcurrent detection resistor for detecting overcurrent flowing through said first series circuit, and means provided in the switching control circuit responsive to input of a detection signal from the overcurrent detection resistor for discontinuing switching of the switching element when overcurrent is detected.

3. A switching power unit according to claim 2, wherein said at least one inductor of small inductance value is two inductors of small inductance value connected in series with the capacitor of large capacitance value one on each side thereof.

4. A switching power unit according to claim 1, wherein said at least one inductor of small inductance value is two inductors of small inductance value connected in series with the capacitor of large capacitance value one on each side thereof.

5. A switching power unit of power feedback type wherein a first series circuit formed of a capacitor of large capacitance value and a discharge diode connected in a direction for discharging the capacitor and a second series circuit formed of a primary winding of a high-frequency transformer and a switching element are connected in parallel between output terminals of a full-wave rectification circuit for converting AC power input from an AC power supply into primary DC power, the primary DC power is switched by the switching element to induce AC power in a secondary winding of the transformer, the induced AC power is rectified and smoothed to output DC power and a part of the power induced in the primary winding of the transformer is fed back to the capacitor, the switching power unit comprising:

at least one inductor of small inductance value connected in series with the capacitor of large capacitance value, a bypass capacitor of small capacitance value connected in parallel with said second series circuit, and a third series circuit formed of a grounding resistor and a grounding capacitor connected between frame ground and at least one end of each of said first and second series circuits.

6. A switching power unit according to claim 5, wherein said at least one inductor of small inductance value is two inductors of small inductance value connected in series with the capacitor of large capacitance value one on each side thereof.

7. A switching power unit of power feedback type wherein a first series circuit formed of a capacitor of large capacitance value and a discharge diode connected in a direction for discharging the capacitor and a second series circuit formed of a primary winding of a high-frequency transformer and a switching element are connected in parallel between output terminals of a full-wave rectification circuit for converting AC power input from an AC power supply into primary DC power, the primary DC power is switched by the switching element to induce AC power in a secondary winding of the transformer, the induced AC power is rectified and smoothed to output DC power and a part of power induced in a third winding of the transformer is fed back to the capacitor, the switching power unit comprising:

at least one inductor of small inductance value connected in series with the capacitor of large capacitance value, a bypass capacitor of small capacitance value connected in parallel with said second series circuit, and a third series circuit formed of a ground resistor and a ground capacitor connected between frame ground and at least one end of each of said first and second series circuits.

8. A switching power unit according to claim 7, wherein said at least one inductor of small inductance value is two inductors of small inductance value connected in series with the capacitor of large capacitance value one on each side thereof.

* * * * *